United States Patent
Mansfield et al.

(10) Patent No.: US 7,023,975 B2
(45) Date of Patent: Apr. 4, 2006

(54) PRIVACY MODE SYSTEM AND METHOD FOR HOME NETWORK TELEPHONE

(75) Inventors: Carl Mansfield, Camas, WA (US); Sherman L. Gavette, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 341 days.

(21) Appl. No.: 10/066,486

(22) Filed: Jan. 31, 2002

(65) Prior Publication Data

US 2003/0035530 A1 Feb. 20, 2003

Related U.S. Application Data

(60) Provisional application No. 60/312,362, filed on Aug. 14, 2001.

(51) Int. Cl.
*H04M 9/00* (2006.01)

(52) U.S. Cl. .............................. 379/167.01; 379/167.11; 379/168; 379/184

(58) Field of Classification Search ... 379/167.01–168, 379/184
See application file for complete search history.

(56) References Cited

U.S. PATENT DOCUMENTS

| | | | | |
|---|---|---|---|---|
| 3,651,274 A | * | 3/1972 | Angner et al. | 379/195 |
| 3,665,112 A | * | 5/1972 | Blake et al. | 379/158 |
| 3,920,929 A | * | 11/1975 | Tate | 379/373.02 |
| 4,100,375 A | * | 7/1978 | Noller | 379/102.01 |
| 4,817,132 A | * | 3/1989 | Chamberlin et al. | 379/165 |
| 4,899,372 A | * | 2/1990 | Wahi et al. | 379/184 |
| 5,444,772 A | * | 8/1995 | Coker | 379/161 |
| 5,764,743 A | * | 6/1998 | Goedken et al. | 379/156 |
| 5,799,062 A | * | 8/1998 | Lazzara et al. | 379/51 |
| 5,960,065 A | * | 9/1999 | Beck et al. | 379/93.07 |
| 6,219,411 B1 | * | 4/2001 | Peters et al. | 379/177 |
| 6,252,952 B1 | * | 6/2001 | Kung et al. | 379/114.1 |
| 6,535,854 B1 | * | 3/2003 | Buchner et al. | 704/275 |
| 2002/0150220 A1 | * | 10/2002 | Weinman, Jr. | 379/88.13 |

* cited by examiner

Primary Examiner—Bing Q. Bui
(74) Attorney, Agent, or Firm—David C. Ripma

(57) ABSTRACT

A system and method are provided for controlling communications privacy in a Home Network telephone system. The method comprises: using a gateway to send and receive calls on at least one external telephone line; supplying privacy and public mode bridging options; and, selectively excluding bridges between external telephone lines and a plurality of Home Network endpoints. In response to the privacy mode being selected, the gateway bridges a call between a first external telephone line and a first endpoint, and prevents bridges between the first external telephone line and other endpoints in the system. Alternately, when the public mode is selected, the gateway bridges a call between the first external telephone line and the first endpoint; and permits bridges between the first external telephone line and other endpoints in the system. That is, while the call is bridged to the first endpoint, a bridge is added between the first telephone line and the second endpoint. The privacy and public mode bridging options are selected with respect to nodes. A node can be an external telephone line or an endpoint. That is, a privacy or public mode of operation can be selected for a first external telephone line, whether calls are received or originated through the Home Network telephone system. Likewise, a privacy or public mode of operation can be selected for a particular endpoint, regardless of whether the endpoint receives or originates the call.

49 Claims, 8 Drawing Sheets

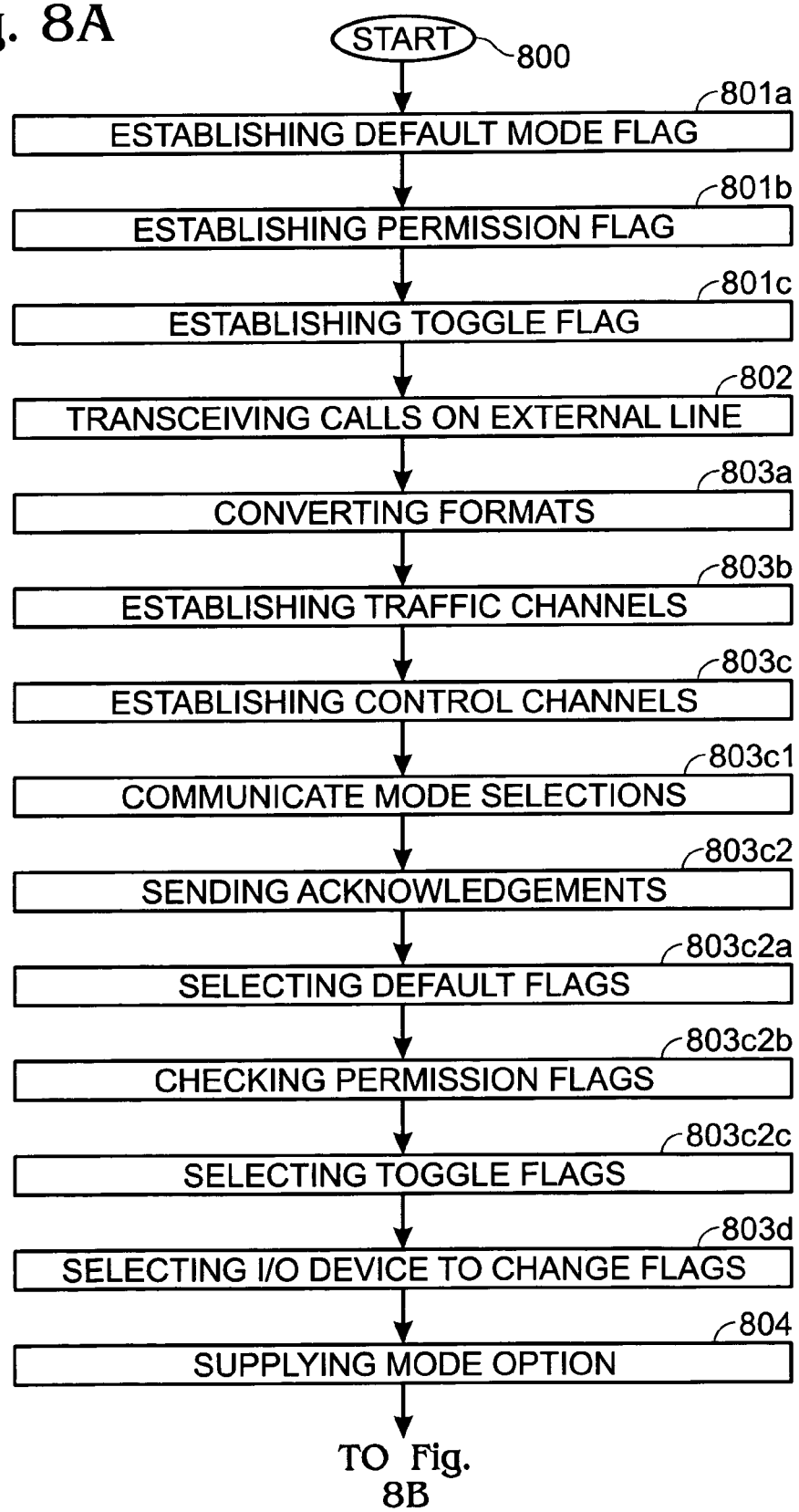

PRIVACY MODE SYSTEM AND METHOD FOR HOME NETWORK TELEPHONE

CROSS-REFERENCE TO RELATED APPLICATION

This application claims the benefit of U.S. Provisional Application No, 60/312,362, filed Aug. 14, 2001.

This application also claims the benefit of U.S. Provisional Application No. 60/327,688, filed Oct. 5, 2001.

BACKGROUND OF THE INVENTION

1. Field of the Invention

This invention generally relates to Home Network telephony and, more particularly, to a system and method for controlling privacy in a Home Network telephone system.

2. Description of the Related Art

In a conventional analog residential telephone system, a user taking a telephone off-hook will join any call currently active on that residential line. In prior art business private branch exchange (PBX) networks having a call manager and distribution system, whenever a new extension goes off-hook, it is connected to the next free external line, and will not join any existing call. However, PBX networks are intended for business use, and typically only have a private mode of operation.

Although Home Network telephone systems have only recently emerged, as yet there appears to be no established process for protecting the privacy of an initial caller, if a second endpoint takes a busy external line off-hook. That is, conventional Home Network systems do not support any kind of privacy mode. The only mode conceived in current Home Network phone systems is the public mode, which mimics some analog telephone line behaviors, although not the change in impedance (volume) that occurs as phones are taken off and on line.

It would be advantageous if a Home Network telephone system existed that supported a private, as well as a public mode of operation.

SUMMARY OF THE INVENTION

The present invention proposes a new capability for the Home Network with an architecture called the privacy mode. It includes the mechanisms for managing and selecting either a public mode (allowing new extension phones to join an existing call) or private mode (barring new extension phones from joining a call) in the Home Network system. It should be understood that a Home Network as used herein, applies to other environments besides a home or residence. The present invention Home Network has equal application is small business environments. Specific features of the system include:

1. Support for a call privacy mode in a Home Network system;

2. Ability to assign and manage the default mode on an extension (endpoint) or an external telephone line basis;

3. Ability to assign different modes to different external lines or extensions (endpoints) in a very flexible manner;

4. Ability to change the mode from an endpoint, or bar mode changes from a specific endpoint;

5. Ability to change the mode for the next call, without altering the default mode; and, 6. Ability to change the mode of a call in progress.

Accordingly, a method is provided for controlling communications privacy in a Home Network telephone system, for use in home and small business environments. The method comprises: using a gateway to send and receive calls on at least one external telephone line; supplying privacy and public mode bridging options; and, selectively excluding bridges between external telephone lines and a plurality of Home Network endpoints. Typically, the endpoints are telephones, either cordless or corded, fax machines, or computers.

In response to the privacy mode being selected, the gateway bridges a call between a first external telephone line and a first endpoint, and prevents bridges between the first external telephone line and other endpoints in the system. Alternately, when the public mode is selected, the gateway bridges a call between the first external telephone line and the first endpoint; and permits bridges between the first external telephone line and other endpoints in the system. That is, while the call is bridged to the first endpoint, a bridge is added between the first telephone line and the second endpoint.

The privacy and public mode bridging options are selected with respect to nodes. A node can be an external telephone line or an endpoint. That is, a privacy or public mode of operation can be selected for a first external telephone line, whether calls are received or originated through the Home Network telephone system. Likewise, a privacy or public mode of operation can be selected for a particular endpoint, regardless of whether the endpoint receives or originates the call.

Additional details of the above-mentioned method, and a Home Network privacy system are described in greater detail below.

BRIEF DESCRIPTION OF THE DRAWINGS

FIGS. 8a and 8b are flowcharts illustrating the present invention method for controlling communications privacy in a Home Network telephone system.

DETAILED DESCRIPTION OF THE PREFERRED EMBODIMENTS

Figure 1:
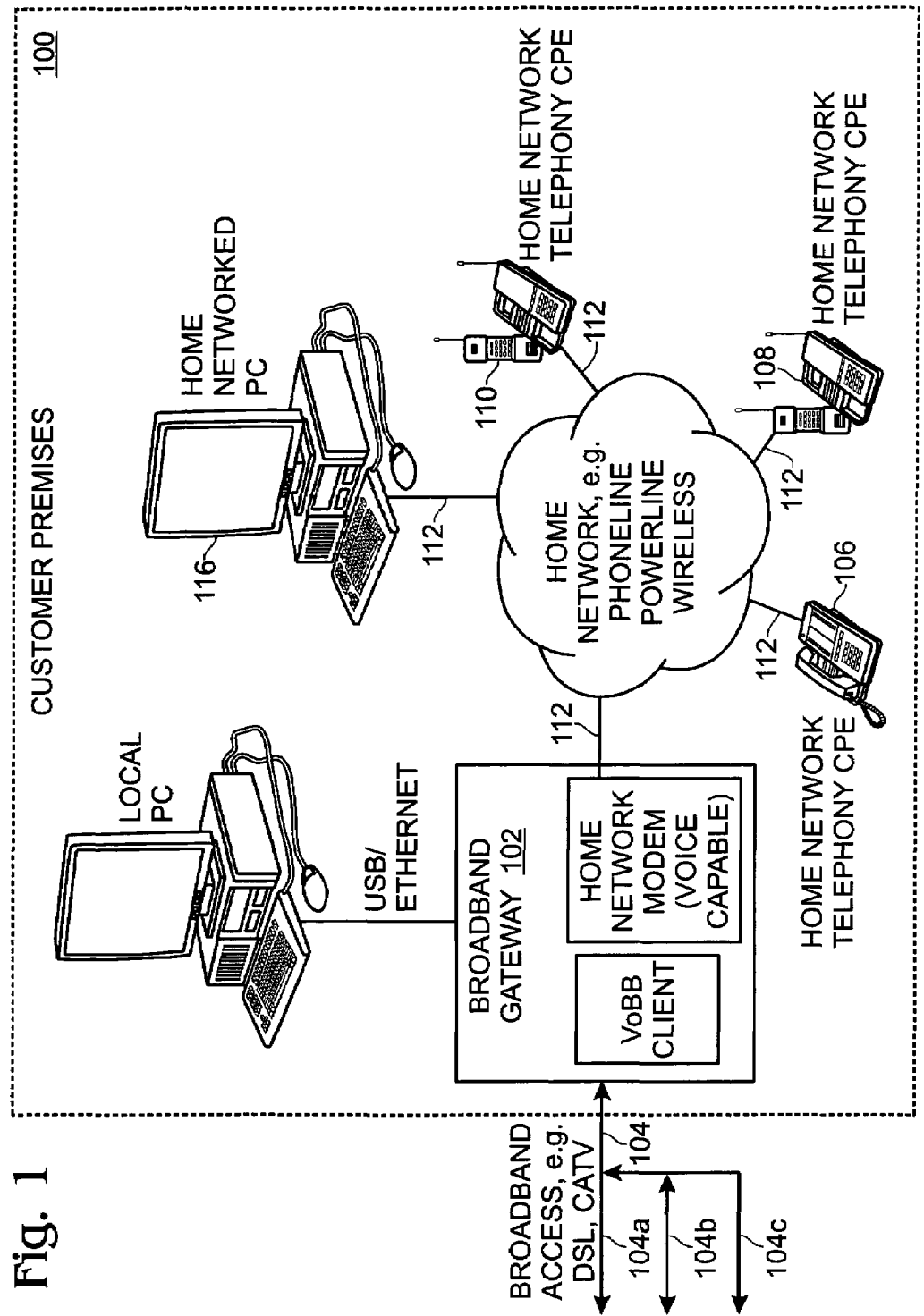
FIG. 1 is a schematic block diagram of the present invention Home Network telephone system for managing privacy.

FIG. 1 is a schematic block diagram of the present invention Home Network telephone system for managing privacy. As explained above, the use of the label "home" should not be taken to imply that the present invention system is limited to just residential applications. The delivery of broadband derived telephone services to the home, small office or small home (SOHO) and small and medium enterprises (SME) are anticipated using voice over broadband protocols such as voice over DSL (VoDSL), voice over cable modem (VoCM), voice over ATM (VoATM), voice over Ethernet, voice over Internet protocol (VoIP), fixed wireless access (FWA), and fibre through the home (FTTH) that are generally referred to herein as voice over broadband (VoBB). For such a system 100 inside the customer premises, derived voice service can be distributed to a number of telephone products, using currently existing hardwired phonelines, Ethernet or IAN networks, or even wireless technologies. A broadband gateway (GW) 102 acts as a bridge and switch between external voice lines and internal extensions.

The Home Network system 100 (for use in residential, SOHO, or business environments) supports digital voice telephony, multiple incoming lines (digital, analog or a combination thereof), multiple extensions and the capability of bridging two or more extensions onto a single call. The voice service arrives from outside the network using a VoBB, integrated services digital network (ISDN), or plain old telephone service (POTS) on line 104 and terminates at a broadband gateway (GW) 102. From the GW 102, the voice service is distributed inside to Home Network telephony products 106–110 (fax, phone, videophone, modem, wireless devices, hardwired devices, or multifunctional peripherals (MFPs)), that are generally referred to herein as endpoints. Although the voice over Home Network (VoHN) protocol described in the present invention system 100 is a modification and extension of voice over home phoneline network alliances (VoHPNA) protocol, the invention is equally applicable to any VoHN protocol. The GW 102 performs the necessary bridging and switching of telephony audio from external lines to the endpoints 106–110.

Alternately stated, the Home Network telephone system 100 comprises a gateway 102 having a port on line 104 for transceiving calls on at least one external telephone line, and a port on line 112 for selectively establishing bridges to the external telephone lines in response to privacy and public modes. It should be understood that line 104 can represent a plurality of external telephone lines. To that purpose, lines 104a, 104b, and 104c are shown. However, the system 100 is not limited to any particular number of lines. Each endpoint has a user interface to accept mode commands and external telephone line selection commands. The user interface can be a keypad, mouse, touchscreen, an audio microphone/speaker combination to support voice-activated commands, or other unnamed input/output devices. Each endpoint 106–110 has a port connected to the gateway on line 112 for supplying mode and external telephone line selection commands. Typically, the same endpoint port and line are used for establishing bridges to external telephone lines 104 through the gateway 102. Although three endpoints are depicted, it should be understood that the system 100 is not limited to any particular number of endpoints. In some aspects of the system 100, an input/output (I/O) device 116, here shown as a personal computer (PC), is also configured as an endpoint.

As an example of the public mode of operation, the gateway 102 bridges a call between the first external telephone line 104a and the first endpoint 106. Then, the gateway 102 adds a bridge between the first telephone line 104a and the second endpoint 108 while the call is bridged to the first endpoint 106.

In one aspect of the system, the gateway 102 exclusively bridges a call between a first external telephone line 104a and a first endpoint 106 in the privacy mode. For example, the gateway 102 bridges a call between the first external telephone line 104a and the first endpoint 106, but prevents bridges between the first external telephone line 104a and other endpoints (108–110) in the system 100.

The system also supports mode toggling during an ongoing call. For example, the gateway bridges a call between the first external telephone line 104a and the first endpoint 106 in the privacy mode. Then, in response to receiving a public mode toggle command, the gateway 102 permits bridges between the first external telephone line 104a and other endpoints (108–110) in the system.

In another example, the gateway 102 bridges a call between the first external telephone line 104a and the first endpoint 106 in the privacy mode. The second endpoint 108 selects the first external telephone line 104a while the call is bridged between the first telephone line 104a and the first endpoint 106. However, the gateway 102 prevents a bridge between the first telephone line 104a and the second endpoint 108.

Two variations exist in switching from the public to private mode while a call is in progress. For example, the gateway 102 bridges a call between the first telephone line 104a and a first endpoint 106, and adds a bridge between the first external telephone line 104a and the second endpoint 108, while in the public mode. In response to a privacy mode toggle command, the gateway 102 drops the bridge between the first telephone line 104a and the second endpoint 108. Alternately, the gateway 102 bridges a call between the first telephone line 104a, the first endpoint 106, and the second endpoint 108 in the public mode. Then, the gateway 102 prevents a bridge between the first telephone line 104a and other endpoints (110) in the system 100 in response to a privacy mode toggle command. That is, no additional endpoints can be added in, but none of the endpoints currently engaged in the call are dropped.

Figure 2:
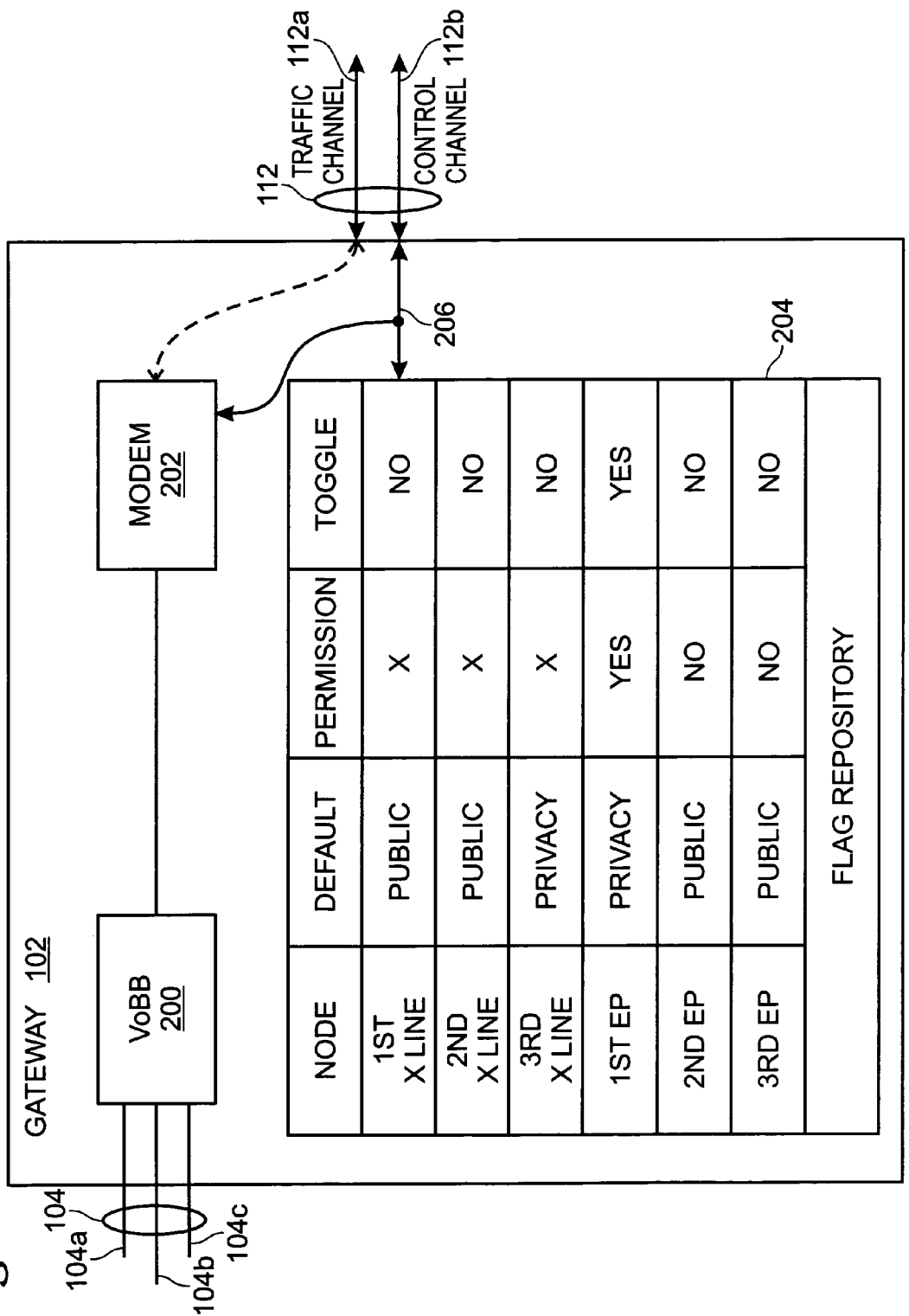
FIG. 2 is a schematic block diagram illustrating the gateway of FIG. 1 in greater detail.

FIG. 2 is a schematic block diagram illustrating the gateway 102 of FIG. 1 in greater detail. The gateway transceives calls on the external telephone lines in a first format. The first format can be a VoBB, ISDN, POTS, or any other format recognized by the gateway 102. The gateway 102 converts between the first format and a digital Home Network format using the VoBB client 200 and Home Network (voice capable) modem 202. The gateway establishes traffic channels 112a between the gateway and the endpoints (see FIG. 1) to communicate information in the Home Network format, and establishes control channels 112b for control messages that include the management of endpoint privacy. Other functions, outside the scope of the present invention, may also be controlled by the control channel and the control messages.

The plurality of endpoints use the control channels 112b to communicate control messages that include privacy and public mode commands to the gateway 102, and the gateway 102 uses the control channels 112b to send mode selection acknowledgements to the endpoints. More specifically, the gateway 102 receives privacy and public mode bridging commands with respect to nodes. The nodes, or communication nodes are either endpoints or external telephone lines. That is, a public or private mode of operation can be selected with respect to the external telephone line involved in the call. For example, the gateway 102 receives a privacy mode command for the first external telephone line 104a and exclusively bridges a call to an endpoint originating a call through the first external telephone line 104a. Likewise, the gateway 102 receives a privacy mode command for the first external telephone line 104a and exclusively bridges a call to an endpoint receiving a call through the first external telephone line 104a.

A public or private mode of operation can be selected with respect to the endpoint involved in the call. For example, the gateway 102 receives a privacy mode command for the first endpoint and exclusively bridges a call to an external telephone line through which the first endpoint originates a call. Likewise, the gateway 102 receives a privacy mode command for the first endpoint and exclusively bridges a call to an external telephone line from which the first endpoint receives a call.

In one aspect of the system, the public and privacy modes are only applied to the external telephone lines. In an alternate aspect of the system, the public and privacy modes of operation are applied only to the endpoints. In some aspects of the system, the mode selection can be made with respect to both kinds of modes. However, conflicts can occur with respect to mode selection. The resolution of such conflicts is discussed in more detail below.

The gateway includes a flag repository 204. The flag repository 204 has a default mode flag for each corresponding node. The flag repository 204 has a port on line 206 to accept control channel communications for the selection default mode flags and for communications with the gateway. As depicted, the gateway communications are conducted with the modem 202, which is assumed to have the capability of operating the various traffic channels in either the privacy or public modes of operation. Alternately, the control is performed by other circuits in the gateway 102, not shown. The gateway 102 accesses default mode flags in the flag repository to determine whether a privacy or a public mode has been selected for a corresponding node.

For example, a "public" default flag is shown for the first external telephone line ($1^{st}$ X line). When receiving a call on the first external telephone line, or when an endpoint originates a call and selects the first external line, the gateway 102 accesses the flag repository 204 to determine the first external telephone line default flag status (value). Since the default flag status is set to "public", the call is conducted in the public mode as described above. This example assumes that the privacy/public mode flags are set in reference to the external telephone line used.

In another example, a call is either received or originated for the first endpoint ($1^{st}$ EP). The gateway 102 checks the default flag status for the first endpoint. Since the default flag status is set to "privacy", the privacy mode of operation is used for the call. This example assumes that the default flags are set in reference to the endpoint involved in the call.

Although both external telephone lines and endpoints are depicted as nodes in the flag repository 204 for convenience, it is not necessary that public and privacy modes of operation be established for all nodes simultaneously due to the inevitable conflicts that would exist between the external telephone lines and the endpoints. Using the examples above, for a call originated by the first endpoint using the first external telephone line, the gateway would access both "privacy" and "public" status flags. However, conflicts can be resolved by establishing a node priority list, or by selecting the privacy (public) mode in the event of a conflict between nodes.

The flag repository 204 further includes a permission flag corresponding to each endpoint. The gateway 102 can receive control channel communication from endpoints attempting the change the default mode flag. For example, if the first endpoint attempts the change its default flag from "privacy" to "public". The gateway 102 checks the corresponding permission flag status to determine whether a communicating node has permission to change the default mode status. To continue the example, the gateway accesses the flag repository 204 to determine the permission flag status. If the permission flag status is "yes", the first endpoint has permission to change default flags. The gateway 102 then changes the default mode flags in response to the permission flag values.

In some aspects of the system, a "yes" permission flag only gives the endpoint permission to change its own default status flag. In other aspects of the system, the "yes" permission flag gives that endpoint permission to change the default flag for any node in the system.

The flag repository 204 includes toggle flags for each corresponding default mode flag. The gateway 102 receives control channel communications for setting toggle flag values. The gateway 102 checks the toggle values for an on-going (currently occurring call) or a subsequent (next occurring) call, and overrides the default mode flag in response to the toggle value. For example, and as depicted, the toggle flag is set to "yes" for the first endpoint. During an on-going, already established call, either to or from the first endpoint, the gateway accesses the flag repository 204, determines that the toggle value is "yes", and overrides the default flag privacy status for that call only. Any call subsequent to that call will revert to the default flag value (unless the toggle flag is reset to "yes"). In some aspects of the invention, the gateway must first check the permission flag before an endpoint is allowed to set a toggle flag to "yes". The toggle operation works equivalently for subsequent calls.

Returning to FIG. 1, options exist for the treatment of an endpoint that is not permitted to use an external telephone line, due to an ongoing privacy mode call. For example, the first endpoint 106 selects the privacy mode and the gateway 102 bridges a call between the first external telephone line 104a and the first endpoint 106. The second endpoint 108 selects the first external telephone line 104a while the call is bridged between the first telephone line 104a and the first endpoint 106. Then, the gateway sends communication, via either a traffic or control channel, to the second endpoint 108. The communication can be a busy signal or a message indicating that a privacy mode call is currently in progress. Alternately, the gateway 102 bridges the second endpoint 108 to an unused external telephone line, external telephone line 104b for example.

A call transfer mechanism exists for transferring a call when operating in the privacy mode. These transfer commands can be made via the endpoint user interfaces. For example, while engaged a privacy mode call, the first endpoint 106 supplies a transfer command to the gateway 102 for transfer of the call to the second endpoint 108. The gateway 102, while the call is in progress, terminates the bridge between the first external telephone line 104a and the first endpoint 106, and establishes a bridge between the first external telephone line 104a and the second endpoint 108 in response to the transfer command.

The system further comprising an input/output (I/O) device 116 having a user interface for accepting external telephone line privacy and public selection commands and a port on line 112 connected to the gateway 102 for selecting flag repository flag values. The I/O device 116 is typically a personal computer or a browser interface. The user interface is typically a keyboard and screen display, although communication could be passed in another format, such as an audio format. The I/O device 116 provides a convenient means of making flag changes in the flag repository, so that the more limited interface capabilities of the endpoints need not be relied upon. The I/O device 116 can also be used for security, so that flag changes are only made using the I/O device 116, which may in turn, have security protocols that restrict access to a limited group of users. In some aspects of the invention, I/O device 116 may also be an endpoint.

Functional Description of the System

The invention makes use of control channel (out-of-band) messaging with the switching and bridging capabilities of gateway. The present invention system requires extensions to the VoHN protocols to support new out-of-band messages. In general, there may be an arbitrary configuration defining which external telephone lines can be used by each endpoint. This configuration may be different for incoming and outgoing use of the lines. Each endpoint can be identified as capable of connecting to a particular set of external telephone lines for incoming calls and for outgoing calls. In the default case, all lines can be accessed by all extensions.

Non-Private (Public) Mode Operation

The present invention non-private, or public mode of operation is similar to the case of legacy analog POTS. With legacy POTS, if there is a call in progress on a particular external line and another endpoint connected to that line goes off-hook, the second endpoint will join the existing call and be able to hear the conversation.

Figure 3:
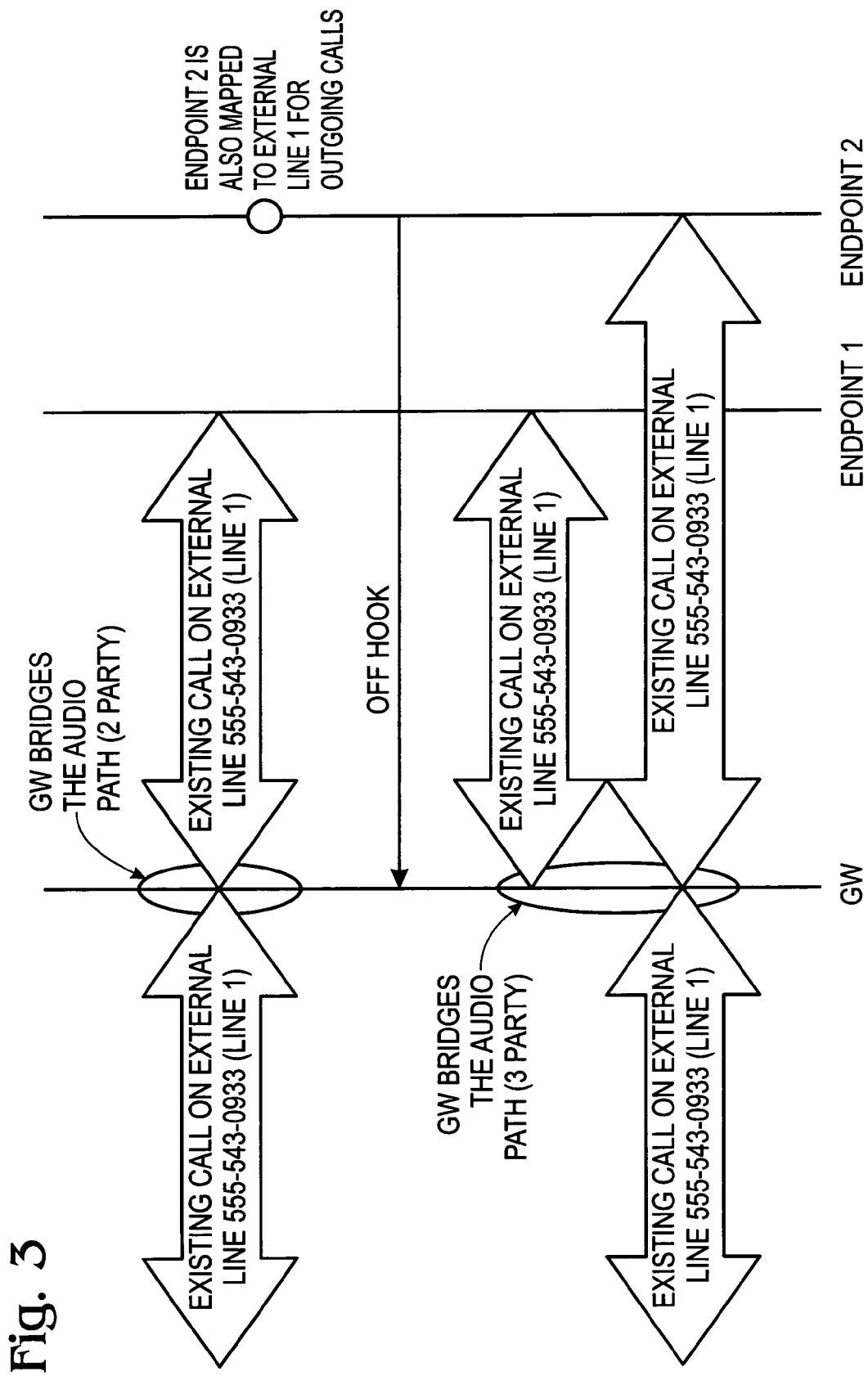
FIG. 3 is a diagram illustrating the present invention system for bridging calls in the public mode of operation.

FIG. 3 is a diagram illustrating the present invention system for bridging calls in the public mode of operation. In the digital Home Network scenario, when a second endpoint goes off-hook on an external line where a call already exists, the off-hook message from the endpoint to the GW results in the GW physically bridging the new extension into the original call, effectively creating a three-way call. This process mimics some of the behavior of analog POTS.

Here, endpoint 1 has an existing call on external line 1. Endpoint 2 is also mapped to use line 1, or has selected external line 1. In some aspects of the system an endpoint may be mapped to multiple lines and will either select a line, or default to an available line. When endpoint 2 is taken off-hook, a control channel message is sent to the GW. This results in the GW establishing an audio path (traffic channel) to the endpoint 2 and bridging it into the existing call, which is now a three party call. All three members can participate in the three-way call. Another behavior can be implemented, where endpoint 2 is warned that a call is in progress on line 1. The user would be asked to confirm whether or not another line should be selected.

Private Mode Operation

This present invention system adds the use of a privacy mode, in addition to the public mode, that prevents another endpoint from joining an existing call. To support the privacy mode, the GW stores a default flag for every endpoint and/or external line, also referred to as nodes, in the network (see FIG. 2). This default flag indicates whether calls involving this node are in either privacy mode, or non-private (public) mode. Privacy can be selected for either the endpoint or the external telephone line.

Figure 4:
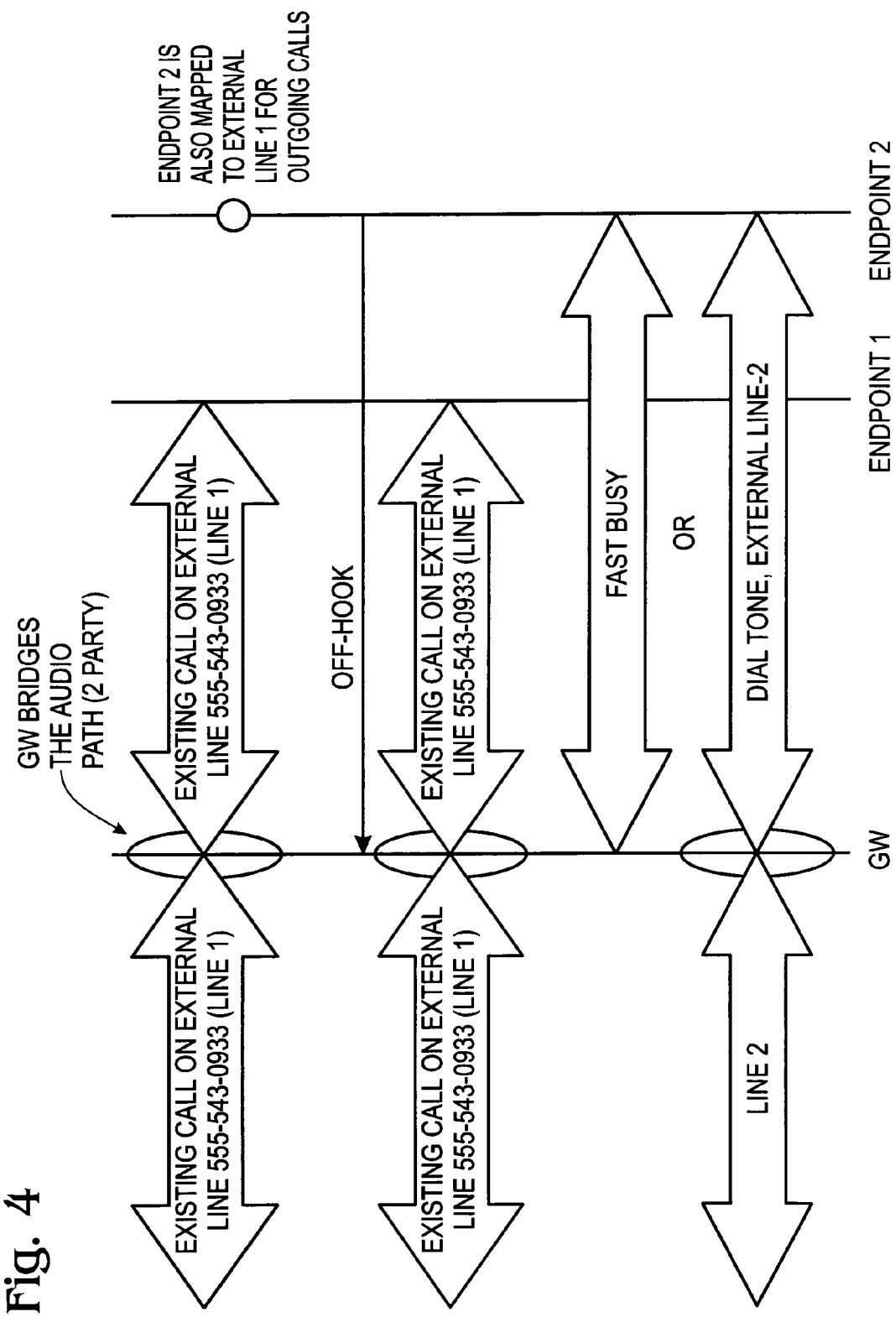
FIG. 4 is a diagram illustrating the present invention system for bridging calls in the privacy mode of operation.

FIG. 4 is a diagram illustrating the present invention system for bridging calls in the privacy mode of operation. Using a similar scenario as mentioned above in the description of FIG. 3, the GW first determines that the call involving endpoint 1 is in the privacy mode. Here, the same process is followed as the last example, up to the off-hook message. However, since the GW knows that endpoint 2 is mapped to external line 1, which is in a call involving a endpoint set to privacy mode, the GW will not bridge endpoint 2 into the existing call. Instead, two possible alternative outcomes can happen:

The audio path is established to the GW, but the GW simply returns a fast busy signal to Phone 2; or, The audio path is established, and the GW connects the user to an alternative external line, e.g. external line 2. Endpoint 2 receives dial tone and can make an out going call. The second option will only occur if the GW is configured such that endpoint 2 is allowed to use external line 2. (e.g. the GW shows that endpoint 2 uses external line 1 as first priority and external line 2 as second priority). Note: If an existing call already had more than one party involved, the mode of the call (privacy or public) would be determined by the private/public mode of the first endpoint participating in the call. Alternately, as mentioned above in the description of FIG. 2, the privacy/public mode determinations are made with respect to the external telephone line involved in the call, not the endpoint(s). As another alternative, the initial mode of the call is determined by the endpoint mode or external line mode, and this initial mode setting can be modified by any endpoint that has permission to toggle the mode.

Management of Private Mode

As mentioned above in the description of FIG. 2, the GW, and more particularly the flag repository, stores three flags for every endpoint in the system. The default flag indicates whether the endpoint's default mode is currently set to public mode or privacy mode. If the privacy mode is set for a first participating endpoint, the GW cannot bridge any other endpoints into a call with this endpoint. In the public mode, the GW can bridge other endpoints into a call for which this endpoint is the first participating internal endpoint. When privacy and public mode decisions are made with respect to the external telephone line, decisions are made with respect to the external telephone line, not with respect to the endpoints bridged into the call.

The permission flag indicates whether the endpoint is able to change the privacy mode. The toggle flag indicates if the current/next call for this node (either endpoint or external telephone line) is to be in a different mode than the default mode. This flag is always cleared after a call is terminated.

Modification of Privacy/Public Modes

The GW can be accessed from an I/O device, such as a PC on the Home Network. For example, the gateway may have an embedded web server that can be browsed from a PC in the Home Network, for configuration purposes. Using this interface and a suitable PC on the network, the user can change the configuration of all applicable flags for each node. A password may be required to access the flag repository. It may not be useful, however, to establish permission flags for the external telephone line nodes. It may be more practical to access the toggle flags from the individual endpoints, as opposed to changing those flags from the I/O device.

Modification of Privacy/Public Mode from Endpoint

The user interface (UI) of the endpoint is able to control at least some aspects of mode setting. In all cases, an endpoint can only change a flag status if the permission flag at the GW indicates that this particular endpoint can change the privacy mode. If not, the GW ignores any requests for mode changes from the endpoint.

The following procedures can be initiated from the endpoint's UI, assuming the endpoint has permission to do so:
1) Changing default mode;
2) Making the next call private (or public); or,
3) Toggling the mode during an existing call.

Figure 5:
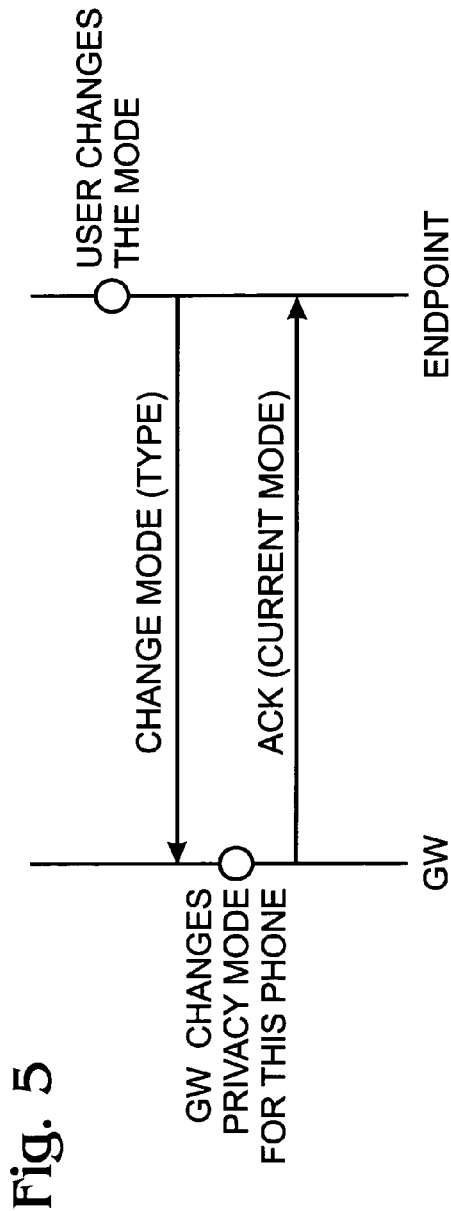
FIG. 5 illustrates the process of changing the privacy/public mode from an endpoint.

FIG. 5 illustrates the process of changing the privacy/public mode from an endpoint. The user changes the privacy mode using the endpoint's UI. An out-of-band (control channel) message is sent to the GW indicating a change in mode, with the value that it should be set to. The GW changes the mode (unless the endpoint does not have permission, in which case no action is taken). The GW returns an acknowledgement that shows the current privacy mode that is set.

Figure 6:
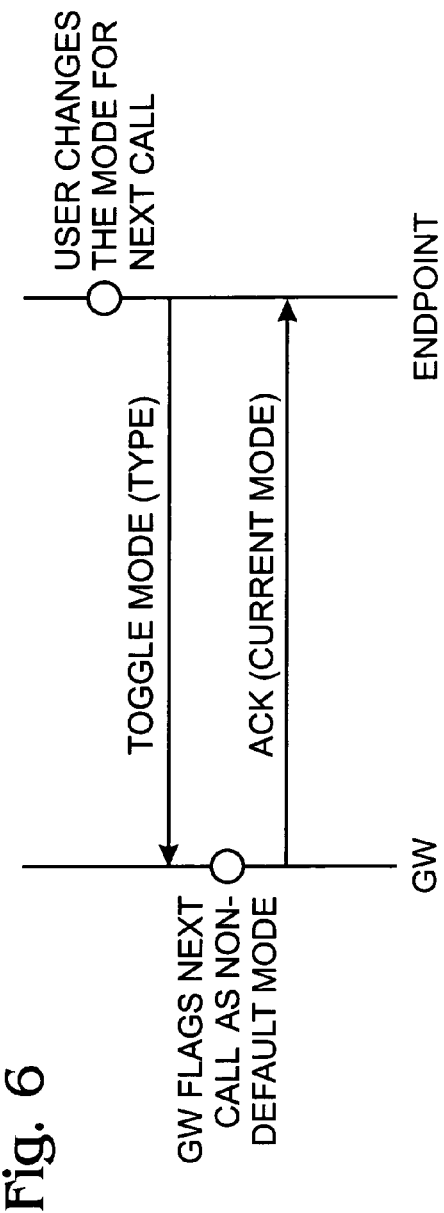
FIG. 6 illustrates the process of changing the privacy/public mode for a subsequent call, from an endpoint.

FIG. 6 illustrates the process of changing the privacy/public mode for a subsequent (next) call, from an endpoint. The user selects toggle private (or toggle public) from the endpoint's UI. Note, the endpoint need not necessarily be "aware" of the current default mode, and may offer only to change the call to the other mode (i.e. if current mode is public, only "toggle privacy" can be selected since "toggle public" is meaningless in this context). An out-of-band (control channel) message is sent to the GW indicating that the subsequent call on this endpoint should be in the non-default mode. If the endpoint is not allowed to change privacy mode, the GW does nothing. A notice may also be sent that the request was refused. Otherwise, the GW sets the toggle flag for this endpoint and will treat the next call using the non-default mode. It does not change the default mode flag. The GW acknowledges the endpoint, indicating the on-going call private (or next call public) mode is set.

Figure 7:
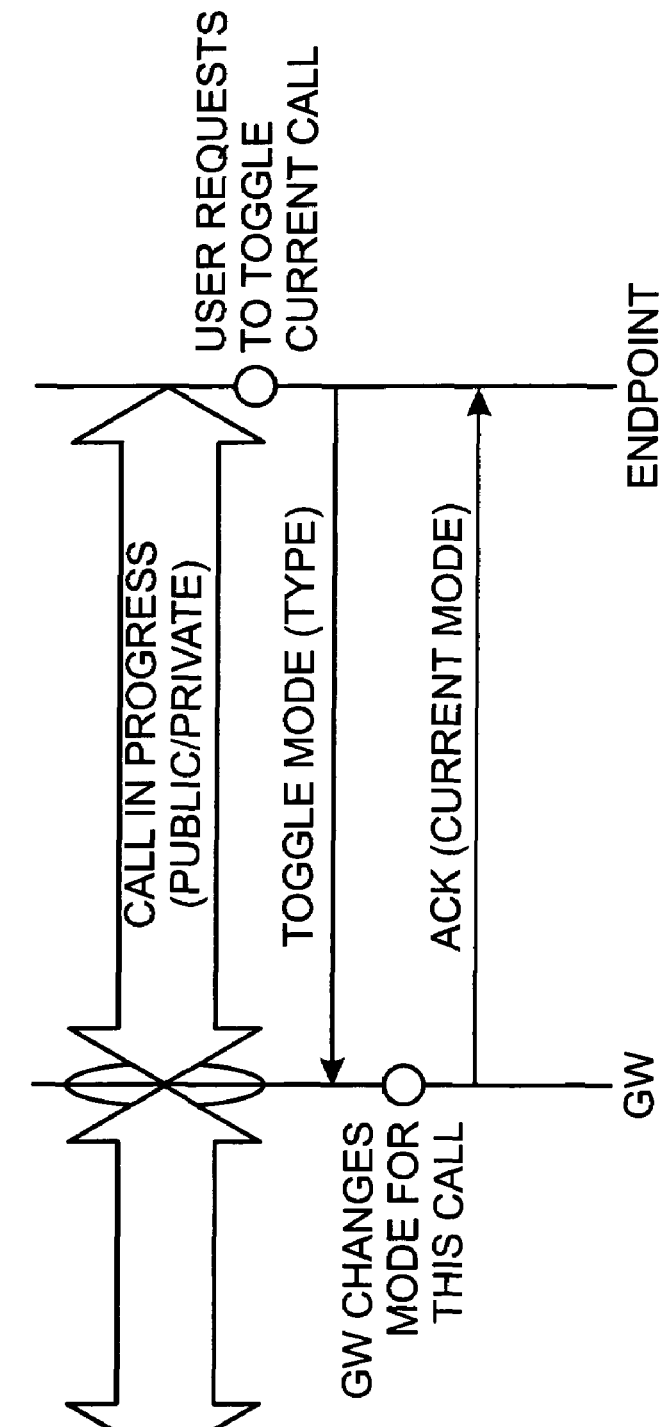
FIG. 7 is a diagram illustrating the process of toggling the privacy/public mode, during a call, from an endpoint.

FIG. 7 is a diagram illustrating the process of toggling the current privacy/public mode, during a call, from an endpoint. There is a call in progress in private (public) mode. The user wants to change the mode to public (private) and selects this using the endpoint UI. An out-of-band (control channel) message is sent to the GW for toggling the mode of the current (on-going) call. If the endpoint is not permitted to change the default mode, no action is taken. A notice may also be sent that the request was refused. Otherwise, the GW changes the mode for this call only and sets the toggle flag to indicate this has been done. The default setting is not changed. The GW acknowledges the mode change. If the change was from a private call to public, now other endpoints will be bridged into the call by the GW. If the change was from public to private mode, other extensions can no longer be bridged into the call. In addition, if there was already another extension bridged into the call, it may be dropped from the three-party bridged call by the GW. In this case, the GW could send to the dropped extension either: (1) "fast busy" tones; (2) dial tone for another outside line; (3) or a pre-recorded message that indicates the call originator has made the call private.

Figure 8B:
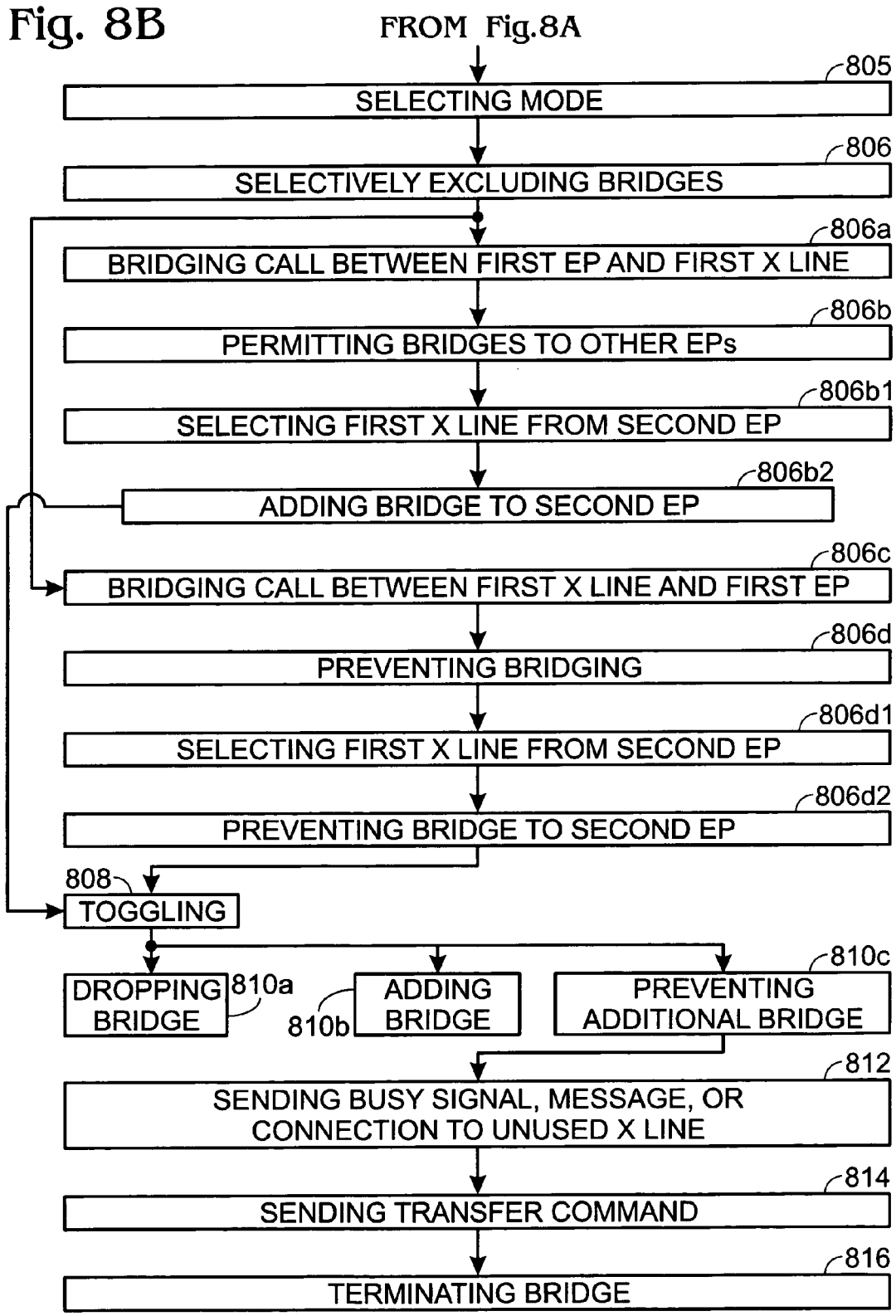

FIGS. 8a and 8b are flowcharts illustrating the present invention method for controlling communications privacy in a Home Network telephone system. Although the method is depicted as a sequence of steps for clarity, no order should be inferred from the numbering unless explicitly stated. The method begins at Step 800. Step 802 transceives calls on at least one external telephone line. Step 804 supplies privacy and public mode bridging options. Supplying privacy and public mode bridging options in Step 804 includes supplying privacy and public mode bridging options with respect to nodes, which are either endpoints or external telephone lines nodes. Step 806 selectively excludes bridges between external telephone lines and a plurality of Home Network endpoints.

Selectively excluding bridges between external telephone lines and a plurality of Home Network endpoints in Step 806 includes exclusively bridging a call between a first external telephone line and a first endpoint from among the plurality of endpoints. Selectively excluding bridges between external telephone lines and a plurality of Home Network endpoints can also include bridging a call between a first external line and a first endpoint, and adding a bridge between the first external telephone line and an additional endpoint.

In some aspects, Step 805 selects the mode, for example a public mode. Then, selectively excluding bridges between external telephone lines and a plurality of Home Network endpoints in Step 806 includes substeps. Step 806a bridges a call between the first external telephone line ($1^{st}$ X line) and the first endpoint ($1^{st}$ EP). Step 806b, in response to the selection of the public mode, permits bridges between the first external telephone line and other endpoints in the system. Permitting bridges between the first external telephone line and other endpoints in the system in Step 806b includes substeps. Step 806b1, from a second endpoint, selects the first external telephone line. Step 806b2, while the call is bridged to the first endpoint, adds a bridge between the first telephone line and the second endpoint.

The method also supports mode toggling during an on-going call. Selectively excluding bridges between external telephone lines and a plurality of Home Network endpoints in Step 806 includes, while in the public mode, bridging a call between the first telephone line and the first endpoint, and adding a bridge between the first external telephone line and a second endpoint. Then, Step 808 toggles. In this case, the toggle occurs from the public to the privacy mode. Step 810a, in response to toggling to the privacy mode, drops the bridge between the first telephone line and the second endpoint.

In some aspects of the method, a further step, Step 805 selects the mode, for example a privacy mode. Selectively excluding bridges between external telephone lines and a plurality of Home Network endpoints in Step 806 includes substeps. Step 806c bridges a call between a first external telephone line and a first endpoint. Step 806d, in response to selecting the privacy mode, prevents bridges between the first external telephone line and other endpoints in the system.

In some aspects, preventing a bridge between the first telephone line and other endpoints in the system in Step 806d includes substeps. Step 806d1, from a second endpoint, selects the first external telephone line. Step 806d2, while the call is bridged between the first telephone line and the first endpoint, prevents a bridge between the first telephone line and the second endpoint.

With respect to toggling, selectively excluding bridges between external telephone lines and a plurality of Home Network endpoints in Step 806 includes, while in the privacy mode, bridging a call between the first telephone line and the first endpoint. Then, Step 808 toggles to the public mode. Step 810b, in response to toggling to the public mode, adds a bridge between the first telephone line and the second endpoint. Alternately, Step 810c, in response to selecting the privacy mode, prevents additional bridges between the first telephone line and other endpoints in the system.

In some aspects of the method, transceiving calls on at least one external telephone line in Step 802 includes communicating information in a first format, as explained earlier. The method then includes further steps. Step 803a, at a gateway, converts between the first format and a digital Home Network format. Step 803b establishes traffic channels between the gateway and the endpoints to communicate information in the Home Network format. Step 803c establishes control channels to control or manage endpoint privacy. In some aspects a further step, Step 803d uses an input/out (I/O) device to supply privacy and public default mode selections, permission flag selections, and toggle flag selections to the gateway.

Establishing a control channel to control endpoint privacy in Step 803c includes substeps. Step 803c1 uses the control channels to communicate privacy and public mode selections to the gateway from the endpoints. Step 803c2 uses the control channels to send mode selection acknowledgements from the gateway to communicating endpoints, in response to making the privacy and public mode selections.

In some aspects of the invention a further step, Step 801a establishes a default mode flag for a first node at the gateway. Using the control channels to communicate privacy and public mode selections from the endpoints to the gateway in Step 803c2 includes using the control channels to select default mode flags. Then, selectively excluding bridges between external telephone lines and a plurality of Home Network endpoints in Step 806 includes using the default mode flags to determine whether a privacy or a public mode has been selected for the first node.

In some aspects a further step, Step 801b establishes a permission flag for each node at the gateway. Using the control channels to communicate privacy and public mode selections from the endpoints to the gateway in Step 803c2 includes substeps. Step 803c2a uses the control channels to select default mode flags. Step 803c2b checks the permission flag status to determine if the communicating node has permission to change default mode flags. Then, selectively excluding bridges between external telephone lines and a plurality of Home Network endpoints in Step 806 includes changing the default mode flag in response to the permission flag status.

In some aspects a further step, Step 801c establishes a toggle flag for each default mode flag at the gateway. Using the control channels to communicate privacy and public mode selections from the endpoints to the gateway in Step 803c2 includes additional substeps. Step 803c2c uses the control channels to select toggle flags for a first call bridged to the first node. The first call is either an on-going or a subsequent call. Then, selectively excluding bridges between external telephone lines and a plurality of Home Network endpoints in Step 806 includes using the toggle flag to change the default mode flag for the first call involving the first node.

Some aspects of the method include a further step. Step 812, in response to preventing a bridge between the first external telephone line and the second endpoint, sends a communication from the gateway to the second endpoint, using either the traffic channel or the control channel, such as a busy signal or a message indicating that a privacy mode call is currently in progress. Alternately, Step 812 bridges the second endpoint to an unused external telephone line, in response to preventing a bridge between the first external telephone line and the second endpoint.

In some aspects a further step, Step 814, following the bridging of a call between the first external telephone line and the first endpoint in the privacy mode, uses the control channels to send a transfer command. Step 816, while the call is in progress, terminates the bridge between the first external telephone line and the first endpoint, and establishes a bridge between the first external telephone line and the second endpoint.

In some aspects, selectively excluding bridges between external telephone lines and a plurality of Home Network endpoints in Step 806 includes bridging a call in response to receiving the call from an external telephone line. Alternately, selectively excluding bridges between external telephone lines and a plurality of Home Network endpoints in Step 806 includes originating the call from an endpoint. Likewise, originating the call from the endpoint includes selecting an external telephone line from the endpoint.

A system and method for private Home Network communications have been provided. However, the present invention is also applicable to any system with similar architecture, regardless of the broadband or Home Network technology used. It is applicable to many kinds of communications product, including video telephony systems. As mentioned above, privacy modes can also be assigned on the basis of external telephone lines, rather than the first involved endpoint. It is also possible for a system to support both types of privacy mode configuration (i.e. Line based and endpoint based). In this case, one of the two conflicting nodes is given priority over the other. Alternatively, both the endpoint and the external telephone line are automatically set to privacy mode in the event of a conflict. Other variations and embodiments will occur to those skilled in the art.

We claim:

1. In a Home Network telephone system, a method for controlling communications privacy, the method comprising:
   transceiving calls on at least one external telephone line, where each external telephone line is associated with a unique telephone number;
   supplying privacy and public mode bridging options; independently selecting private and public modes for each external telephone line;
   in response to the selecting the public mode for a first external telephone line, permitting bridges through a gateway, between the first external telephone line and any endpoint; and
   in response to selecting the privacy mode for the first external telephone line, selectively excluding bridges through the gateway, between the first external telephone line and some but not all of the endpoints.

2. The method of claim 1 wherein selectively excluding bridges between the first external telephone line and the endpoints includes exclusively bridging a call between the first external telephone line and a first endpoint.

3. The method of claim 1 wherein permitting bridges between the first external telephone line and any endpoint includes:
   from a second endpoint, selecting the first external telephone line; and,
   while the call is bridged to the first endpoint, adding a bridge between the first telephone line and the second endpoint.

4. The method of claim 1 wherein selecting the public mode for the first external telephone line includes:
   while in the public mode, bridging a call between the first telephone line and the first endpoint; and,
   adding a bridge between the first external telephone line and a second endpoint; and,
   the method further comprising:
   toggling to the privacy mode for the first external telephone line; and, in response to toggling to the privacy mode, dropping the bridge between the first telephone line and the second endpoint.

5. The method of claim 1 wherein selecting the public mode for the first external telephone line includes, while in the public mode, bridging a call between the first telephone line, the first endpoint, and a second endpoint; and, the method further comprising:

selecting the privacy mode for the first external telephone line; and, in response to selecting the privacy mode, preventing a bridge between the first telephone line and other endpoints in the system.

6. The method of claim 1 wherein selecting the privacy mode for the first external telephone line includes:

bridging a call between the first external telephone line and a first endpoint; and, in response to selecting the privacy mode for the first external telephone line, preventing bridges between the first external telephone line and other endpoints in the system.

7. The method of claim 6 wherein selecting the privacy mode for the first external telephone line includes, while in the privacy mode, bridging a call between the first telephone line and the fist endpoint; and, the method further comprising:

toggling to the public mode for the first external telephone line; and, in response to toggling to the public mode, adding a bridge between the first telephone line and a second endpoint.

8. The method of claim 6 wherein preventing abridge between the first telephone line and other endpoints in the system includes:

from a second endpoint, selecting the first external telephone line; and, while the call is bridged between the first telephone line and the first endpoint, preventing a bridge between the first telephone line and the second endpoint.

9. The method of claim 1 wherein transceiving calls on at least one external telephone line includes communicating information in a first format;

the method further comprising:

at a gateway, converting between the first format and a digital Home Network format;

establishing traffic channels between the gateway and the endpoints to communicate information in the Home Network format; and, establishing control channels to control endpoint privacy.

10. The method of claim 9 wherein establishing a control channel to control endpoint privacy includes:

using the control channels to communicate privacy and public mode selections to the gateway from the endpoints; and, using the control channels to send mode selection acknowledgements from the gateway to communicating endpoints, in response to making the privacy and public mode selections.

11. The method of claim 10 further comprising:

at the gateway, establishing a default mode flag for the first external telephone line;

wherein using the control channels to communicate privacy and public mode selections from the endpoints to the gateway includes using the control channels to select default mode flags; and, wherein selectively excluding bridges between the first external telephone line and the endpoints includes using the default mode flags to determine whether a privacy or a public mode has been selected for the first external telephone line.

12. The method of claim 11 further comprising:

at the gateway, establishing a permission flag for each external telephone line;

wherein using the control channels to communicate privacy and public mode selections from the endpoints to the gateway includes:

using the control channels to select default mode flags;

checking the permission flag status to determine if the communicating node has permission to change default mode flags; and, wherein selectively excluding bridges between the first external telephone line and the endpoints includes changing the default mode flag in response to the permission flag status.

13. The method of claim 11 further comprising:

at the gateway establishing a toggle flag for each default mode flag;

wherein using the control channels to communicate privacy and public mode selections from the endpoints to the gateway includes:

using the control channels to select toggle flags for a first call bridged to the first external telephone line selected from the group including on-going and subsequent calls; and, wherein selectively excluding bridges between the first external telephone line and the endpoints includes using the toggle flag to change the default mode flag for the first call involving the first eternal telephone line.

14. The method of claim 13 further comprising:

in response to preventing a bridge between the first external telephone line and a second endpoint, sending a communication from the gateway to the second endpoint selected from the group including a busy signal and a message indicating that a privacy mode call is currently in progress.

15. The method of claim 13 further comprising:

in response to preventing a bridge between the first external telephone line and a second endpoint, bridging the second endpoint to an unused external telephone line.

16. The method of claim 13 further comprising:

following the bridging of a call between the first external telephone line and the first endpoint in the privacy mode, using the control channels to send a transfer command; and, while the call is in progress, terminating the bridge between the first external telephone line and the first endpoint, and establishing a bridge between the first external telephone line and the second endpoint.

17. The method of claim 13 wherein selectively excluding bridges between the first external telephone line and the endpoints includes bridging a call in response to receiving the call on an external telephone line.

18. The method of claim 13 wherein selectively excluding bridges between the first external telephone line and the endpoints includes originating the call from an endpoint.

19. The method of claim 18 wherein originating the call from an endpoint includes selecting an external telephone line from the endpoint.

20. The method of claim 13 further comprising:

using an input/output (I/O) device, supplying privacy and public default mode selections, permission flag selections, and toggle flag selections to the gateway.

21. The method of claim 1 further comprising:
independently selecting private and public modes for each Home Network endpoint;
in response to the selecting the public mode for a first endpoint, permitting bridges through the gateway, between a second endpoint and the first external telephone line, when the first endpoint is bridged to the first external telephone line; and,
in response to selecting the privacy mode for the first endpoint excluding bridges though the gateway, between the second endpoint and the first external telephone line, when the first endpoint is bridged to the first external telephone line.

22. The method of claim 21 wherein selecting the privacy mode for the first endpoint includes exclusively bridging a call to an external telephone line through which the first endpoint originates a call.

23. The method of claim 21 wherein selecting the privacy mode for the first endpoint includes exclusively bridging a call to an external telephone line from which the first endpoint receives a call.

24. A Home Network telephone privacy management system comprising:
a gateway having a port for transceiving calls on at least one external telephone line, where each external telephone line is associated with a unique telephone number, a port for receiving public and privacy mode selection commands, independently for each external telephone line, and a port for establishing bridges to the external telephone lines;
a plurality of Home Network endpoints, each endpoint having a user interface to accept mode commands and external telephone line selection commands, each endpoint having a port connected to the gateway for supplying mode and external telephone line selection commands, each endpoint having a port for establishing bridges to external telephone lines through the gateway;
wherein the gateway, in response to the selection of the public mode for a first external telephone line, permits bridges between the first external telephone line and any endpoint; and
wherein the gateway, in response to the selection of the privacy mode for the first external telephone line, selectively excludes bridges between the first external telephone line and some but not all of the endpoints.

25. The system of claim 24 wherein the gateway exclusively bridges a call between the first external telephone line and a first endpoint in the privacy mode.

26. The system of claim 24 wherein the gateway bridges a call between the, first external line, a first endpoint, and a second endpoint in the public mode.

27. The system of claim 24 wherein the gateway bridges a call between the first external telephone line and a first endpoint, and prevents bridges between the first external telephone line and other endpoints in the system in the privacy mode.

28. The system of claim 27 wherein the gateway bridges a call between the first external telephone line and the first endpoint in the privacy mode; and,
wherein the gateway permits bridges between the first external telephone line and other endpoints in the system, in response to receiving a public made toggle command.

29. The system of claim 27 wherein the gateway bridges a call between the first external telephone line and the first endpoint in the public mode; and,
wherein the gateway adds a bridge between the first telephone line and a second endpoint while the call is bridged to the first endpoint.

30. The system of claim 24 wherein the gateway bridges a call between a first telephone line and a first endpoint, and adds a bridge between the first external telephone line and a second endpoint; and,
wherein the gateway drops the bridge between the first telephone line and the second endpoint in response to a privacy mode toggle command.

31. The system of claim 24 wherein the gateway bridges a call between the first telephone line, a first endpoint, and a second endpoint in the public mode; and,
wherein the gateway prevents a bridge between the first telephone line and other endpoints in the system in response to a privacy mode toggle command.

32. The system of claim 24 wherein the gateway bridges a call between the first external telephone line and a first endpoint in the privacy mode;
wherein a second endpoint selects the first external telephone line while the call is bridged between the first telephone line and the first endpoint; and,
wherein the gateway prevents a bridge between the first telephone line and the second endpoint.

33. The system of claim 24 wherein the gateway transceives calls on the external telephone lines in a first format, converts between the first format and a digital Home Network format, establishes traffic channels between the gateway and the endpoints to communicate information in the Home Network format, and establishes control channels to manage endpoint privacy.

34. The system of claim 33 wherein the plurality of endpoints use the control channels to communicate privacy and public mode commands to the gateway; and,
wherein the gateway uses the control channels to send mode selection acknowledgements to the endpoints.

35. The system of claim 34 wherein the gateway receives a privacy mode command for the first external telephone line and exclusively bridges a call to an endpoint originating a call through the first external telephone line.

36. The system of claim 34 wherein the gateway receives a privacy mode command for the first external telephone line and exclusively bridges a call to an endpoint receiving a call through the first external telephone line.

37. The system of claim 34 wherein a first endpoint selects the privacy mode for the first external telephone line;
wherein the gateway bridges a call between the first external telephone line and the first endpoint;
wherein a second endpoint selects the first external telephone line while the call is bridged between the first telephone line and the first endpoint; and,
wherein the gateway sends a communication to the second endpoint selected from the group including a busy signal and a message indicating that a privacy mode call is currently in progress.

38. The system of claim 34 wherein a fist endpoint selects the privacy mode for the first external telephone line;
wherein the gateway bridges a call between the first external telephone line and the first endpoint;
wherein a second endpoint selects the first external telephone line while the call is bridged between the first telephone line and the first endpoint; and,
wherein the gateway bridges the second endpoint to an unused external telephone line.

39. The system of claim 34 wherein a first endpoint supplies a transfer command to the gateway fur the transfer of a privacy mode call to a second endpoint; and, wherein the gateway, while the call is in progress, terminates the bridge between the first external telephone line and the first endpoint, and establishes a bridge between the first external telephone line and the second endpoint in response to the transfer command.

40. The system of claim 34 wherein the system further comprises a gateway flag repository having a default mode flag for each corresponding external telephone line, wherein the flag repository has a port to accept control channel communications for selecting default mode flags and for communications with the gateway; and, wherein the gateway accesses default mode flags in the flag repository to determine whether a privacy or a public mode has been selected for a corresponding external telephone line.

41. The system of claim 40 wherein the flag repository further includes a permission flag corresponding to each endpoint; and, wherein the gateway receives control channel communications from endpoints attempting to change the default mode flag, the gateway checking the corresponding permission flag status to determine whether a communicating endpoint has permission to change the default mode status, and the gateway changing the default mode flags in response to the permission flag values.

42. The system of claim 41 wherein the flag repository includes toggle flags for each corresponding default mode flag; and, wherein the gateway receives control channel communications for setting toggle flag values, the gateway checking the toggle values during a first call selected from the group including on-going and subsequent calls, and overriding the default mode flag for the first call in response to the toggle value.

43. The system of claim 42 further comprising:
an input/output (I/O) device having a user interface for accepting external telephone Line privacy and public selection commands and a port connected to the gateway for selecting flag repository flag values.

44. The system of claim 24 wherein the gateway receives public and privacy mode selection commands, independently for endpoint;

wherein the gateway, in response to the selection of the public mode for a first endpoint, permits bridges between a second endpoint and the first external telephone line, when the first endpoint is bridged to the first external telephone line; and, wherein the gateway, in response to selection of the privacy mode for the first endpoint, excludes bridges between the second endpoint and the first external telephone line, when the first endpoint is bridged to the first external telephone line.

45. The system of claim 44 wherein the gateway exclusively bridges a call between the first endpoint and the first external telephone line when operating in the privacy mode.

46. The system of claim 44 wherein the gateway bridges a call between the first endpoint and the first external telephone line, and prevents bridges between the first external telephone line and other endpoints when operating in the privacy mode.

47. The system of claim 44 wherein the gateway transceives calls on the external telephone lines in a first format, converts between the first format and a digital Home Network format, establishes traffic channels between the gateway and the endpoints to communicate information in the Home Network format, and establishes control channels to manage endpoint privacy.

48. The system of claim 44 wherein the gateway receives a privacy mode command for the first endpoint and exclusively bridges a call to an external telephone line through which the first endpoint originates a call.

49. The system of claim 44 wherein the gateway receives a privacy mode command for the first endpoint and exclusively bridges a call to an external telephone line from which the first endpoint receives a call.

* * * * *